US012326816B2

(12) United States Patent
Gayen et al.

(10) Patent No.: US 12,326,816 B2
(45) Date of Patent: Jun. 10, 2025

(54) TECHNOLOGIES FOR OFFLOAD DEVICE FETCHING OF ADDRESS TRANSLATIONS

(71) Applicant: Intel Corporation, Santa Clara, CA (US)

(72) Inventors: Saurabh Gayen, Portland, OR (US); Philip R. Lantz, Cornelius, OR (US); Dhananjay A. Joshi, Portland, OR (US); Rupin H. Vakharwala, Hillsboro, OR (US); Rajesh M. Sankaran, Portland, OR (US); Narayan Ranganathan, Bangalore (IN); Sanjay Kumar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 929 days.

(21) Appl. No.: 17/129,496

(22) Filed: Dec. 21, 2020

(65) Prior Publication Data
US 2021/0149815 A1    May 20, 2021

(51) Int. Cl.
*G06F 12/10* (2016.01)
*G06F 12/0875* (2016.01)
(Continued)

(52) U.S. Cl.
CPC .......... *G06F 12/10* (2013.01); *G06F 12/0875* (2013.01); *G06F 13/28* (2013.01);
(Continued)

(58) Field of Classification Search
CPC ...... G06F 12/10; G06F 12/0875; G06F 13/28; G06F 13/4027; G06F 13/4282
(Continued)

(56) References Cited

U.S. PATENT DOCUMENTS

| 7,657,724 B1* | 2/2010 | DeHaemer | G06F 12/04 711/217 |
| 9,672,148 B1* | 6/2017 | Michaud | G06F 12/0868 |

(Continued)

OTHER PUBLICATIONS

Advanced Micro Devices, Inc.; "AMD I/O Virtualization Technology (IOMMU) Specification License Agreement," IOMMU Architectural Specification, Rev. 2.00; Mar. 24, 2011; 167 pages.

(Continued)

*Primary Examiner* — Titus Wong
(74) *Attorney, Agent, or Firm* — Alliance IP, LLC

(57) ABSTRACT

Techniques for offload device address translation fetching are disclosed. In the illustrative embodiment, a processor of a compute device sends a translation fetch descriptor to an offload device before sending a corresponding work descriptor to the offload device. The offload device can request translations for virtual memory address and cache the corresponding physical addresses for later use. While the offload device is fetching virtual address translations, the compute device can perform other tasks before sending the corresponding work descriptor, including operations that modify the contents of the memory addresses whose translation are being cached. Even if the offload device does not cache the translations, the fetching can warm up the cache in a translation lookaside buffer. Such an approach can reduce the latency overhead that the offload device may otherwise incur in sending memory address translation requests that would be required to execute the work descriptor.

22 Claims, 8 Drawing Sheets

(51) Int. Cl.
*G06F 13/28* (2006.01)
*G06F 13/40* (2006.01)
*G06F 13/42* (2006.01)

(52) U.S. Cl.
CPC ...... *G06F 13/4027* (2013.01); *G06F 13/4282* (2013.01); *G06F 2212/602* (2013.01); *G06F 2212/657* (2013.01); *G06F 2213/0026* (2013.01)

(58) Field of Classification Search
USPC .......................................................... 711/204
See application file for complete search history.

(56) References Cited

U.S. PATENT DOCUMENTS

| | | | |
|---|---|---|---|
| 10,248,574 B2 | 4/2019 | Vakharwala et al. | |
| 2006/0075146 A1* | 4/2006 | Schoinas | G06F 12/1009 710/22 |
| 2006/0075147 A1* | 4/2006 | Schoinas | G06F 12/1027 710/22 |
| 2006/0230223 A1* | 10/2006 | Kruger | G06F 12/1009 711/6 |
| 2007/0288721 A1* | 12/2007 | Kruger | G06F 12/1027 711/E12.057 |
| 2008/0028181 A1* | 1/2008 | Tong | G06F 12/1027 711/207 |
| 2010/0011187 A1* | 1/2010 | Schoinas | G06F 12/109 710/22 |
| 2018/0011651 A1* | 1/2018 | Sankaran | G06F 12/1009 |
| 2019/0138240 A1 | 5/2019 | Gayen et al. | |
| 2019/0220413 A1 | 7/2019 | Vakharwala et al. | |
| 2019/0317802 A1* | 10/2019 | Bachmutsky | G06F 9/5044 |
| 2020/0278935 A1* | 9/2020 | Borikar | G06F 12/12 |
| 2022/0137967 A1* | 5/2022 | Koker | G06F 7/5443 |

OTHER PUBLICATIONS

ARM; ARM System Memory Management Unit Architecture Specification, SMMU architecture v 3.0 and v. 3.1; 2016; 443 pages.
EPO; Extended European Search Report issued in EP Patent Application No. 21197132.0, dated Mar. 10, 2022; 13 pages.
Intel; "Intel Data Streaming Accelerator Preliminary Architecture Specification," Revision 1.0; Nov. 2019; 125 pages.

* cited by examiner

400 — TRANSLATION FETCH DESCRIPTOR

| BYTE 7 | BYTE 6 | BYTE 5 | BYTE 4 | BYTE 3 | BYTE 2 | BYTE 1 | BYTE 0 | BYTES |
|---|---|---|---|---|---|---|---|---|
| OP. | FLAGS | | | P | RESERVED | PASID | | 0 |
| COMPLETION RECORD ADDRESS | | | | | | | | 8 |
| ADDRESS | | | | | | | | 16 |
| | | | | | | | | 24 |
| | | COMP. INT. HANDLE | | REGION SIZE | | | | 32 |
| | | | | REGION STRIDE | | | | 40 |
| RESERVED | | | | | | | | 48 |
| | | | | | | | | 56 |

FIG. 4

500 — TRANSLATION FETCH COMPLETION RECORD

| BYTE 7 | BYTE 6 | BYTE 5 | BYTE 4 | BYTE 3 | BYTE 2 | BYTE 1 | BYTE 0 | BYTES |
|---|---|---|---|---|---|---|---|---|
| BYTES COMPLETED | | | | UNUSED | | RESULT | STATUS | 0 |
| FAULT ADDRESS | | | | | | | | 8 |
| UNUSED | | | | | | | | 16 |
| | | | | | | | | 24 |

FIG. 5

TECHNOLOGIES FOR OFFLOAD DEVICE FETCHING OF ADDRESS TRANSLATIONS

BACKGROUND

Offload devices such as accelerators are a type of connected device or endpoint that can offload general purpose processing and execute certain workloads with additional capacity or more efficiently in terms of performance and power. Address virtualization capabilities allow for scalable, robust use of accelerators. An operating system can manage virtual address spaces and the assignment of real memory to virtual memory. Real memory is addressed using physical addresses while virtual memory is addressed using virtual addresses. Address translation hardware in the central processing unit, often referred to as a memory management unit or MMU, can translate virtual addresses to physical addresses.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 4 is a table depicting one embodiment of a translation fetch descriptor that may be used by the compute device of FIG. 1;

FIG. 5 is a table depicting one embodiment of a translation fetch completion record that may be used by the compute device of FIG. 1;

DETAILED DESCRIPTION OF THE DRAWINGS

Figure 1:
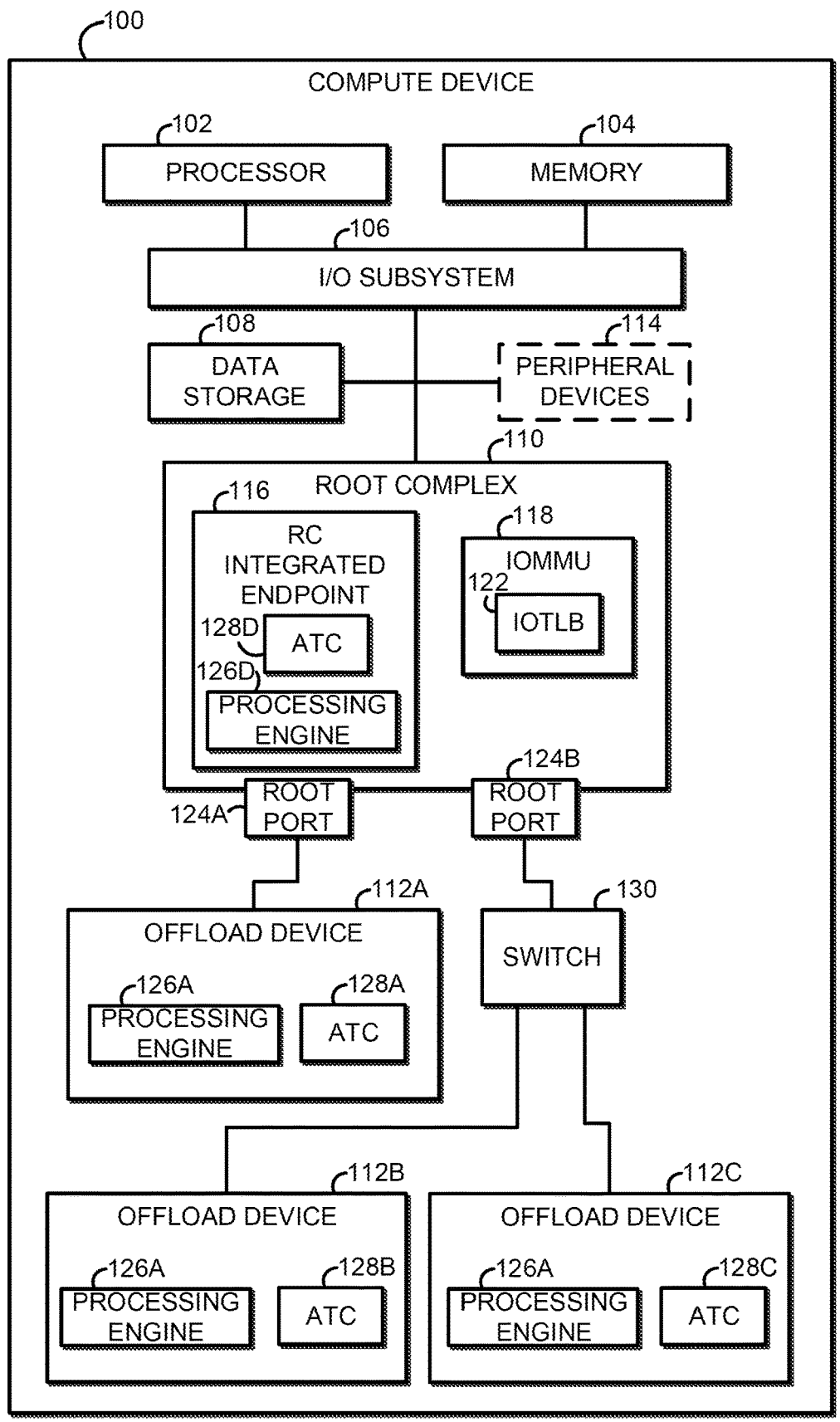
FIG. 1 is a simplified block diagram of at least one embodiment of a compute device with an offload device for fetching of address translations.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative compute device 100 is configured to offload certain tasks to one or more offload devices 112A, 112B, 112C. Application software executing on the processor 102 can prepare and send work descriptors to the offload devices 112A, 112B, 112C. As described in more detail below, the application can determine what memory address the offload device 112 will need to access in order to perform the work offloaded to it. Prior to sending the work descriptor to the offload device 112, the application can send a translation fetch descriptor to the offload device 112 instructing the offload device 112 to fetch address translations for a certain range of virtual memory addresses. The offload device 128 can then cache the physical addresses corresponding to the virtual memory addresses, and the application can then send the work descriptor to the offload device 112. Additionally or alternatively, the RCiEP 116 and/or the IOLTB 122 can cache virtual-to-physical memory addresses or intermediate structures to enable more efficient translations. The illustrative offload device 112 can then perform direct memory access (DMA) operations as part of performing the task corresponding to the work descriptor with little or no latency added by looking up memory address translations, as the physical memory addresses can be cached on the offload device 112.

It should be appreciated that certain workloads may particularly benefit from lower-latency offloading that the present disclosure can enable. For example, if the time from work submission to work completion end-to-end latency must be extremely low, then the time spent performing memory translations should be reduced or minimized. As another example, if high performance is required for a stream of small packets, then low latency is particularly important to make sure packets can stream smoothly without large latencies between packets, causing large delays.

It should further be appreciated that workloads with certain characteristics may be particularly well-suited to use the concepts disclosed herein. For example, if software is able to predict which addresses will need to be accessed in future jobs, such as using the addresses of existing jobs it is submitting as a basis for predicting the addresses of future jobs, sending a translation fetch descriptor may significantly reduce the latency for performing future jobs. If the software has an established workflow and knows where future jobs will appear, it can speculatively fetch the memory address translations that will be needed. As another example, if a particularly large sequential address trace is to be submitted, software can interleave translation fetch descriptors ahead of its work submissions. This approach would be particularly useful if the offload device 112 does not support deep DMA work submission queues.

The compute device 100 may be embodied as any type of compute device with an offload device 112 capable of fetching memory translations as described herein. For example, the compute device 100 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. The illustrative compute device 100 includes the processor 102, a memory 104, an input/output (I/O) subsystem 106, data storage 108, a root complex 110, one or more offload devices 112A, 112B, 112C, and, optionally, one or more peripheral devices 114. In some embodiments, one or more of the illustrative components of the compute device 100 may be incorporated in, or otherwise form a portion of, another component. For example, the memory 104, or portions thereof, may be incorporated in the processor 102 in some embodiments.

The processor 102 may be embodied as any type of processor capable of performing the functions described herein. For example, the processor 102 may be embodied as a single or multi-core processor(s), a single or multi-socket processor, a digital signal processor, a graphics processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 102, the memory 104, and other components of the compute device 100 on a single integrated circuit chip.

The data storage 108 may be embodied as any type of device or devices configured for the short-term or long-term storage of data. For example, the data storage 108 may include any one or more memory devices and circuits, memory cards, hard disk drives, solid-state drives, or other data storage devices.

The illustrative root complex 110 (RC) may be, e.g., a PCIe RC or other type of device hosting system (e.g., PCI bridge). The RC 110 connects a processor and memory subsystem (e.g., the processor 102 and the memory 104) to one or more devices, such as offload devices 112A, 112B, 112C coupled to the RC 110 by a root port (RP) 124A, 124B and a multi-lane link. The RC 110 can include a root complex integrated endpoint (RCiEP) 116. In some embodiments, a switch fabric 130 can be coupled to the RC 110 via an RP 124 across a multi-lane link. The switch fabric 130 can be coupled to one or more offload devices 112 across a multi-lane link to connect the devices 112 to the RC 110.

The illustrative RC 110 is coupled to the memory 104. The memory 104 can be used by the one or more devices (such as offload devices 112A, 112B, 112C) for memory transactions, such as reads and writes, to execute jobs tasked by the processor 102 or other component of the compute device 100. The RC 110 also includes an input/output memory management unit 118 (IOMMU) that includes an input/output translation lookaside buffer 122 (IOTLB). In some embodiments, the IOMMU 118 may be referred to as a translation agent and/or the IOTLB 122 may be referred to, include, or form a part of an address translation and protection table (ATPT). In the illustrative embodiment, the IOMMU 118 and IOTLB 122 form part of the RC 110. Additionally or alternatively, in some embodiments, some or all of the IOMMU 118 and/or the IOTLB 122 may be a separate component from the RC 110. The IOMMU 118 can include hardware circuitry, software, or a combination of hardware and software. The IOMMU 118 and the IOTLB 122 can be used to provide address translation services (ATS) for address spaces in the memory 104 to allow one or more of the offload devices 112A, 112B, 112C to perform memory transactions to satisfy job requests issued by the host system.

The RCiEP 116 and offload devices 112A, 112B, 112C can be devices that are compliant with an interconnect protocol, such as PCIe or CXL. Examples of devices include accelerators, disk controller, network controller, graphics controller, or other type of device that is involved in streaming workloads. Each of RCiEP 116 and devices 112A, 112B, 112C can include an address translation cache 128A, 128B, 128C, 128D (ATC). Each ATC 128A, 128B, 128C, 128D can include an indexed random access memory for storing a mapping between virtual addresses and physical addresses, and can index the mapping. Additionally or alternatively, each ATC 128A, 128B, 128C, 128D may be cache-hit based. Other types of memory can be used for the ATC 128A, 128B, 128C, 128D. The ATC 128A, 128B, 128C, 128D can be considered a memory element that has one or more memory element locations or entries, and each memory element location can be indexed. An index value can point to a memory element location that is allocated for or contains a virtual memory address and physical memory address translation. In some embodiments, the ATC 128A, 128B, 128C, 128D may be embodied as, may include, or may form a part of a translation fetch buffer (TPB).

Each offload device 112A, 112B, 112C includes a processing engine 126A, 126B, 126C. Similarly, the RCiEP 110 may contain a processing engine 126D. Each processing engine 126A-D may be embodied as, e.g., a processor, a memory, a graphics processing unit, an accelerator, an application specific integrated circuit (ASIC), a field programmable gate array (FPGA), and/or the like. In some embodiments, the RCiEP 110 may perform similar or the same functions as the offload devices 112A-C or may be considered or referred to as an offload device.

The root complex 110, root ports 124A and 124B, the switch fabric 130, and the links can be compliant with the PCIe protocol and/or the CXL protocol. Other interconnect protocols are also within the scope of the disclosure.

Workloads for the offload devices 112A-C may be generalized as involving reading data from memory, processing that data, and then writing the processed data back to memory. With the addition of ATS, the device manages the translation of provided Virtual Addresses (VAs) to Physical Addresses (PAs). To read from memory, the device first translates (or requests translation of) the provided VA to a PA and then uses that translated PA to perform a memory read. Similarly, in order to write to memory the device must also first translate the provided VA to a PA and then use that translated PA to write to memory.

VA can include any untranslated address including Virtual Address, Guest Physical Address, Input Output Virtual Address, etc. PA translation can include a PA translation of a requested VA, but can also include permissions. Stored in the ATC 128 are not only the VA and PA, but also the permissions that were returned along with the PA. Similarly, the ATC 128 receives permissions along with the PA translation.

In some embodiments, the compute device 100 may include other or additional components, such as those commonly found in a compute device. For example, the compute device 100 may also have peripheral devices 114, such as a display, a keyboard, a mouse, etc. The display may be embodied as any type of display on which information may be displayed to a user of the compute device 100, such as a touchscreen display, a liquid crystal display (LCD), a light emitting diode (LED) display, a cathode ray tube (CRT) display, a plasma display, an image projector (e.g., 2D or 3D), a laser projector, a heads-up display, and/or other display technology.

Figure 2:
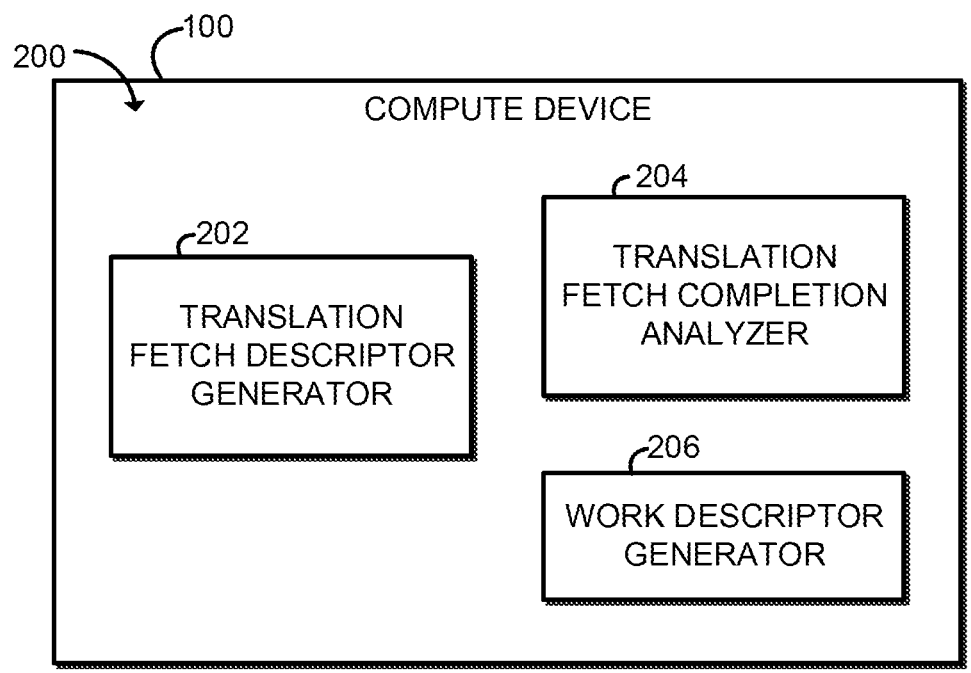
FIG. 2 is a simplified block diagram of at least one embodiment of an environment that may be established by the compute device of FIG. 1.

Referring now to FIG. 2, in an illustrative embodiment, the compute device 100 establishes an environment 200 during operation. The illustrative environment 200 includes a translation fetch descriptor generator 202, a translation fetch completion analyzer 204, and a work descriptor generator 206. The various modules of the environment 200 may be embodied as hardware, software, firmware, or a combination thereof. For example, the various modules, logic, and other components of the environment 200 may form a portion of, or otherwise be established by, the processor 102 or other hardware components of the compute device 100 such as the memory 104, the root complex 110, etc. As such, in some embodiments, one or more of the modules of the environment 200 may be embodied as circuitry or collection of electrical devices (e.g., translation fetch descriptor generator circuitry 202, translation fetch completion analyzer circuitry 204, work descriptor generator circuitry 206, etc.). It should be appreciated that, in such embodiments, one or more of the circuits (e.g., the translation fetch descriptor generator circuitry 202, the translation fetch completion analyzer circuitry 204, the work descriptor generator circuitry 206, etc.) may form a portion of one or more of the processor 102, the memory 104, the I/O subsystem 106, the data storage 108, the root complex 110, and/or other components of the compute device 100. For example, in some embodiments, some or all of the modules may be embodied as the processor 102 as well as the memory 102 and/or data storage 108 storing instructions to be executed by the processor 102. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 102 or other components of the compute device 100. It should be appreciated that some of the functionality of one or more of the modules of the environment 200 may require a hardware implementation, in which case embodiments of modules which implement such functionality will be embodied at least partially as hardware.

The translation fetch descriptor generator 202, which may be embodied as hardware, firmware, software, virtualized hardware, emulated architecture, and/or a combination thereof as discussed above, is configured to generate a translation fetch descriptor, such as the translation fetch descriptor shown in FIG. 4. To do so, the translation fetch descriptor generator 202 may identify a task to be offloaded to an offload device 112. The task may be any suitable task, such as a task that is well-suited to the architecture of a particular offload device 112 or a task that is offloaded to free up additional resources for the processor 102. The task may be identified based on being a task that is scheduled to be performed at a particular time, a task that is projected to be performed at a particular time, a task that is upcoming in a task queue. In some embodiments, the task may be a task that may or may not be performed, and the compute device 100 may instruct the offload device 112 to fetch address translations in order to be prepared in case the task is executed.

The translation fetch descriptor generator 202 determines memory locations that are expected to be accessed during execution of the task. The translation fetch descriptor generator 202 may determine those memory addresses based on any suitable approach, such as a predetermined set of memory addresses associated with the task to be performed. In some embodiments, the translation fetch descriptor generator 202 may determine a range of memory addresses based on memory addresses associated with a current task different from the identified task to be performed. For example, a current task may be associated with a certain range of a memory addresses, and the subsequent task may be expected to be associated with a range of memory addresses that is adjacent to that of the range of memory addresses for the current task. In some embodiments, the range of memory addresses to be accessed during execution of the task may be non-sequential.

The translation fetch descriptor generator 202 may then prepare the translation fetch descriptor based on the identified range of virtual memory address to be accessed during execution of the task. The translation fetch descriptor may indicate, e.g., the beginning of the range of virtual memory addresses to be translated, the size of the virtual memory addresses to be translated, the stride to use in translating addresses, write permissions, etc., as described in more detail below.

The translation fetch completion analyzer 204, which may be embodied as hardware, firmware, software, virtualized hardware, emulated architecture, and/or a combination thereof as discussed above, is configured to receive and analyze a translation fetch completion record, such as the translation fetch completion record shown in FIG. 5. The translation fetch completion analyzer 204 may be invoked when the processor 102 receives an interrupt that the translation fetch descriptor has been completed. The translation fetch completion analyzer 204 reviews the results of the completion record and may take certain action based on that record. For example, if a page fault could not be cleared, the translation fetch completion analyzer 204 may resolve the page fault. As another example, if an error occurred, the translation fetch completion analyzer 204 may take some other action to address the error, may delay performance of the task identified in block 602, may cancel performance of the task, and/or the like.

The work descriptor generator 206 is configured to prepare and send a work descriptor to the offload device 112. It should be appreciated that the compute device 100 may perform certain tasks related to preparing the work descriptor generator 206 while the translation fetch descriptor is being executed by the offload device 112, such as reading from or writing to the virtual memory addresses that the offload device 112 is caching translations of.

Figure 3:
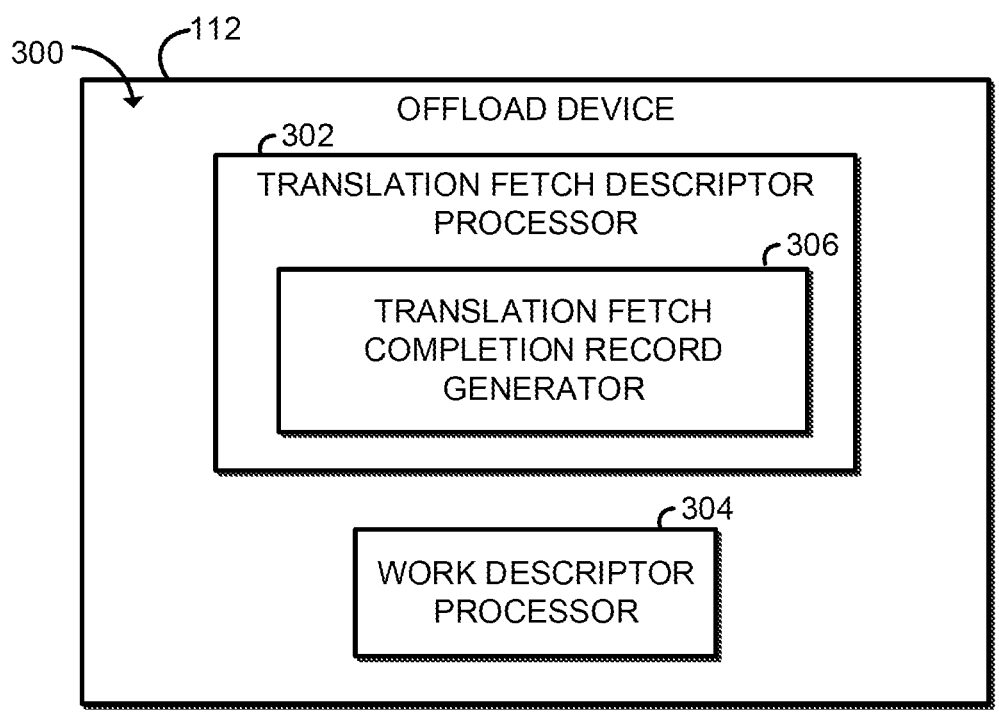
FIG. 3 is a simplified block diagram of at least one embodiment of an environment that may be established by the offload device of FIG. 1 and/or the RCiEP of FIG. 1.

Referring now to FIG. 3, in an illustrative embodiment, the offload device 112 (or the RCiEP 116) establishes an environment 300 during operation. The illustrative environment 300 includes a translation fetch descriptor processor 302 and a work descriptor processor 304. The various modules of the environment 300 may be embodied as hardware, software, firmware, or a combination thereof. For example, the various modules, logic, and other components of the environment 300 may form a portion of, or otherwise be established by, a processor or other hardware components of the offload device 112 such as memory, data storage, an FPGA, an ASIC, etc. As such, in some embodiments, one or more of the modules of the environment 300 may be embodied as circuitry or collection of electrical devices (e.g., translation fetch descriptor processor circuitry 302, work descriptor processor circuitry 304, etc.). It should be appreciated that, in such embodiments, one or more of the circuits (e.g., the translation fetch descriptor processor circuitry 302, the work descriptor processor circuitry 304, etc.) may form a portion of one or more of a processor memory, data storage, FPGA, ASIC, and/or other components of the offload device 112. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the offload device 112. It should be appreciated that some of the functionality of one or more of the modules of the environment 300 may require a hardware implementation, in which case embodiments of modules which implement such functionality will be embodied at least partially as hardware.

The translation fetch descriptor processor 302, which may be embodied as hardware, firmware, software, virtualized hardware, emulated architecture, and/or a combination thereof as discussed above, is configured to process and execute a translation fetch descriptor. The translation fetch descriptor processor 302 may receive a translation fetch descriptor from the processor 102. The translation fetch descriptor indicates a range of virtual memory addresses that should be translated as well as certain flags. As described in more detail below, the flags may include a request write permission flag, a potential write permission flag, a block of fault flag, and a use stride flag.

The translation fetch descriptor processor 302 is configured to loop through each virtual memory address that is to be translated and, for each virtual address, prepare and send an ATS to the IOMMU 118. Parameters for the ATS may be determined based on the parameters of the translation fetch descriptor, as discussed in more detail below. In some cases, the response to the ATS may indicate that a page fault occurred. In such a situation, the translation fetch descriptor processor 302 may determine whether to submit a PRS request to clear the page fault. The translation fetch descriptor processor 302 caches the physical addresses corresponding to the virtual addresses in the ATC 128.

The translation fetch descriptor processor 302 includes a translation fetch completion record generator 306. The translation fetch completion record generator 306 is configured to prepare a translation fetch completion record after the translation fetch descriptor has been processed. The translation fetch completion record may indicate, e.g., the bytes completed, whether the operation was completed successfully, and any status information, such as the presence of uncleared page faults or requested write permissions that were not granted. The translation fetch completion record may include a fault address that indicates at which address an unrecoverable page fault occurred. The translation fetch completion record generator 306 sends the translation fetch completion record to the host processor 102 by writing the completion record to a location in the memory 102 (or a cached location corresponding to a location in the memory 102) and then sending the processor 102 an interrupt.

The work descriptor processor 304, which may be embodied as hardware, firmware, software, virtualized hardware, emulated architecture, and/or a combination thereof as discussed above, is configured to receive a work descriptor from the processor 102. The work descriptor processor 304 executes the work descriptor, which includes performing direct memory access (DMA) operations. The DMA operations may be performed using the physical addresses cached in the ATC 128, avoiding the latency required by requesting that the IOMMU 118 perform the translations. For addresses that are not cached in the ATC 128, the latency may still be reduced by either fetching the physical address in the IOMMU 118 or by performing at least some of the page walks necessary to translate the physical address in the IOMMU 118.

Referring now to FIG. 4, in one embodiment, a translation fetch descriptor 400 may be formatted as shown. The illustrative translation fetch descriptor 400 includes an operation byte as the first byte, identifying the descriptor as a translation fetch descriptor. The operation byte is followed by several flags, which are described in more detail below, and then a privileged bit, which indicates whether or not privileged access should be requested. The process address space identifier (PASID) indicates which process address space should be used. Typically, the PASID used corresponds to the process executing on the processor 102 that sends the descriptor, but, in some embodiments, a process may send a descriptor asking for access to memory from a different address space.

The completion address record indicates where the offload device 112 should send the translation fetch completion record 500 (see FIG. 5) to indicate the results of executing the translation fetch descriptor 400. The completion interrupt handle indicates which interrupt vector to use to notify software that the translation fetch descriptor 400 has been executed.

The address indicates the starting address of the virtual memory address range for which translation should be requested. The region size indicates how long of a range to cover. The total range of virtual memory addresses for which translation should be requested begins at "address" and ends at "address+region size." The region stride indicates how much space should be between each virtual memory request and the next virtual memory request. For example, in some embodiments, the page size for the memory 102 may be 2 MB, and the region stride may then indicate that the stride between virtual memory address translation requests should be 2 MB. The region stride may vary from, e.g., 4 kB to 1 GB. The region size may be selected to match certain parameters, such as the page size of the operating system, which would clear any page faults that might otherwise occur during execution of the workload.

The flags may include a request write permission flag, a potential write permission flag, a block on fault flag, and a use stride flag. The request write permission flag may be used to indicate whether write permission should be requested in requesting the memory address translation, and the potential write permission flag indicates whether a potential write should be indicated in the ATS requests, as described in more detail below. The block on fault flag indicates how a page fault should be handled. The flag indicates whether the offload device 112 should block when encountering a page fault and resolve the page fault using a page request service (PRS) request. A PRS request may require software to address the page fault, which may incur a high latency overhead. The block on fault flag may be disabled based on device capabilities or device configuration. The stride flag indicates whether the value of the region stride included in the translation fetch descriptor 400 should be used in determining the distance between consecutive virtual memory address translation requests. If the stride flag is 0, then the offload device 112 may use a default stride value. It should be appreciated that, in some embodiments, the offload device 112 may decide what stride to use, regardless of what is provided in the stride flag or the region stride value.

Referring now to FIG. 5, in one embodiment, a translation fetch completion record 500 may be formatted as shown. The illustrative translation fetch completion record 500 includes the number of bytes for which a memory translation request was completed. The bytes completed may be less than the region size requested in the translation fetch descriptor 400 if, e.g., a page fault was encountered that was not cleared or some other error occurred. The result byte and status byte indicate whether execution of the translation fetch descriptor 400 was successfully completed and, if not, an indication of what problem was encountered. The fault address indicates at which address an unrecoverable page fault occurred.

It should be appreciated that the descriptor and record shown in FIGS. 4 & 5 are one of many possible embodiments for how an indication of memory addresses to fetch can be sent to an offload device 112. In other embodiments, a descriptor providing an indication of memory addresses to fetch may be sent in any other suitable message, packet, instruction, command, format, etc.

Figure 6:
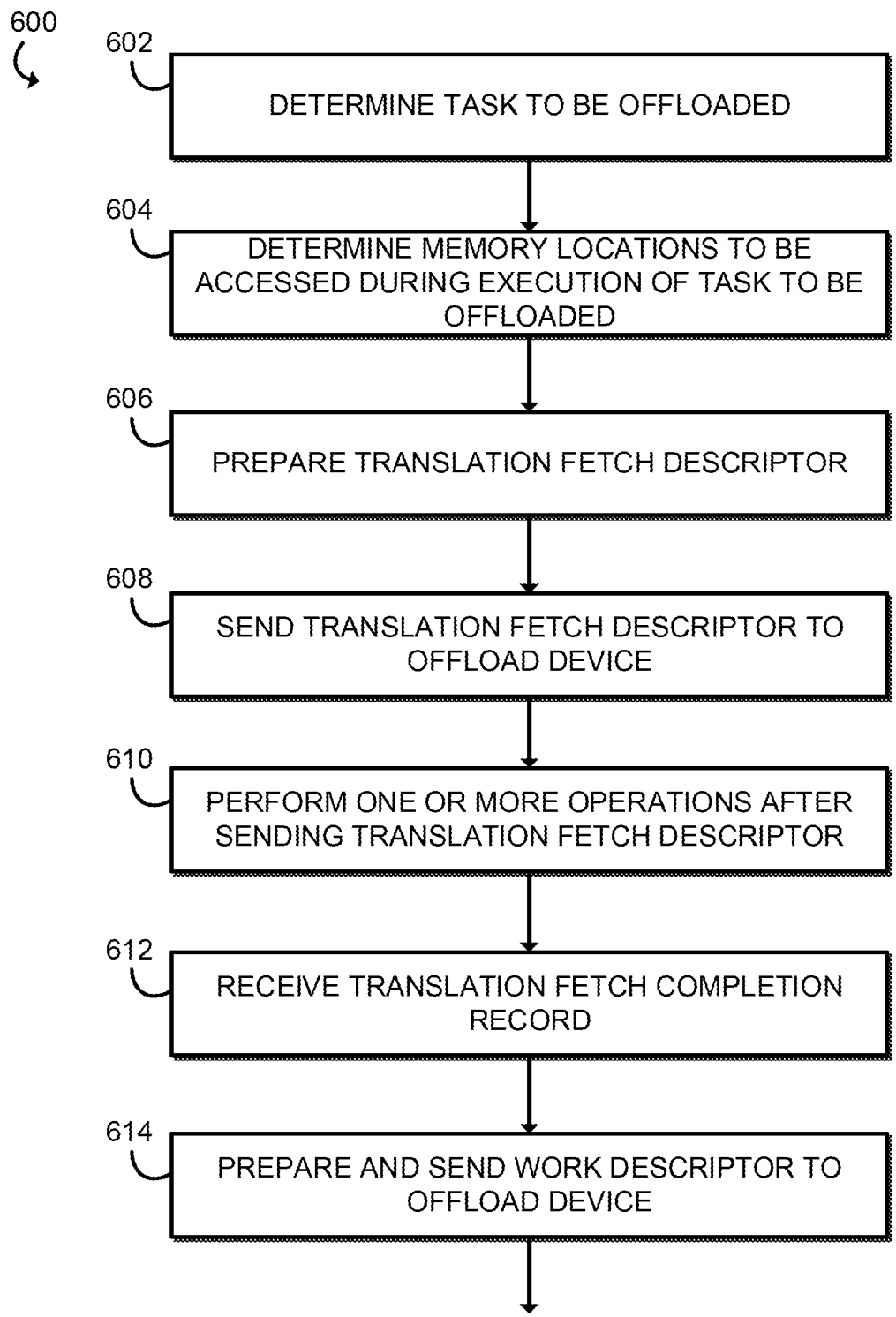
FIG. 6 is a simplified flow diagram of at least one embodiment of a method for off-loading a task that may be performed by the compute device of FIG. 1.

Referring now to FIG. 6, in use, the compute device 100 may execute a method 600 for requesting offload device 112 fetching of address translation. The method 600 may be performed by any suitable combination of hardware, software, and/or other components of the compute device 100, such as the processor 102, the memory 104, the data storage 108, the translation fetch descriptor generator 202, the translation fetch completion analyzer 204, and the work descriptor generator 206. In block 602, the compute device 100 determines a task to be offloaded to an offload device 112. The task may be any suitable task, such as a task that is well-suited to the architecture of a particular offload device 112 or a task that is offloaded to free up additional resources for the processor 102. The task may be identified based on being a task that is scheduled to be performed at a particular time, a task that is projected to be performed at a particular time, a task that is upcoming in a task queue. In some embodiments, the task may be a task that may or may not be performed, and the compute device 100 may instruct the offload device 112 to fetch address translations in order to be prepared in case the task is executed.

In block 604, the compute device 100 determines memory locations that are expected to be accessed during execution of the task. The compute device 100 may determine those memory addresses based on any suitable approach, such as a predetermined set of memory addresses associated with the task to be performed. In some embodiments, the compute device 100 may determine a range of memory addresses based on memory addresses associated with a current task different from the task identified in block 602. For example, a current task may be associated with a certain range of a memory addresses, and the subsequent task may be expected to be associated with a range of memory addresses that is adjacent to that of the range of memory addresses for the current task. In some embodiments, the range of memory addresses to be accessed during execution of the task may be non-sequential.

In block 606, the compute device 100 prepares a translation fetch descriptor, such as a translation fetch descriptor formatted as shown in FIG. 4. The translation fetch descriptor may indicate, e.g., the beginning of the range of virtual memory addresses to be translated, the size of the virtual memory addresses to be translated, the stride to use in translating addresses, write permissions, etc., as described above. In block 608, the processor 102 sends the translation fetch descriptor to the offload device 112.

In block 610, the compute device 100 may perform one or more operations after sending the translation fetch descriptor to the offload device 112. It should be appreciated that the compute device 100 may continue to read from and write to the virtual memory addresses that were sent to the offload device 112 for translation without interfering with the address translation fetch operation, as reading from and writing to the virtual memory addresses does not change the physical address corresponding to each virtual address. As such, the processor 102 can continue to perform operations on data necessary for the task identified in block 102 while the offload device 112 is preparing to access that data by fetching address translations.

In block 612, the compute device 100 receives the translation fetch completion record from the offload device 100, such as by receiving an interrupt indicating that the translation fetch completion record has been entered into a cache location of the memory 102. In some embodiments, the compute device 100 may review the results of the translation fetch completion record and take certain action based on that record. For example, if a page fault could not be cleared, the compute device 100 may perform a PRS request. As another example, if an error occurred, the computer device 100 may take some other action to address the error, may delay performance of the task identified in block 602, may cancel performance of the task, and/or the like.

In block 614, the compute device 100 prepares and sends a work descriptor to the offload device 112. The offload device 112 may then perform the task, while the processor 102 and other components of the compute device 100 perform other tasks.

Figure 7:
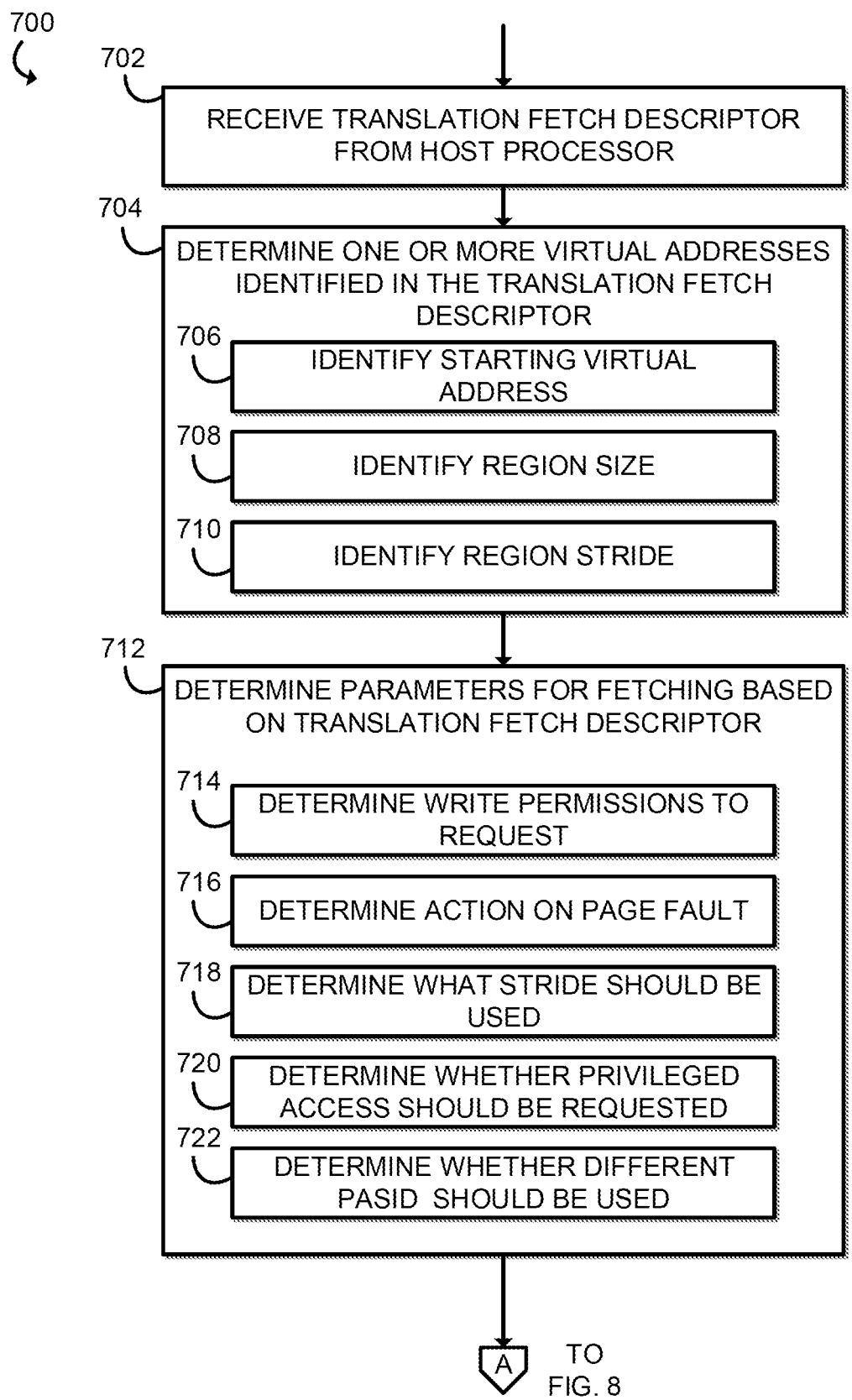
FIGS. 7-10 are a simplified flow diagram of at least one embodiment of a method for fetching address translations that may be executed by the some or all components of the compute device of FIG. 1.

Referring now to FIG. 7, in use, an offload device 112 (such as offload device 112A, 112B, or 112C or RCiEP 116) may execute a method 700 for fetching of address translation. The method 700 may be performed by any suitable combination of hardware, software, and/or other components of the offload device 112, such as an ASIC, an FPGA, a processor, memory, data storage, circuitry, and/or the like. In some embodiments, certain steps of the method 700 may be performed by another component of the compute device 100, such as part or all of the root complex 110. In block 702, the offload device 112 receives a translation fetch descriptor from the processor 102 such as a translation fetch descriptor formatted as shown in FIG. 4. The translation fetch descriptor indicates that the descriptor is for an address translation fetch operation. The illustrative descriptor indicates the beginning of the range of virtual memory addresses to be translated, the size of the virtual memory addresses to be translated, and the stride to use in translating addresses. The descriptor may include one or more flags, including a request write permission flag, a potential write permission flag, a block of fault flag, and a use stride flag.

In block 704, the offload device 112 determines one or more virtual addresses identified in the translation fetch descriptor. The offload device 112 may identify a starting virtual address in block 706, may identify a region size in block 708, and may identify a region stride in block 710.

In block 712, the offload device 112 determines parameters for fetching based on the translation fetch descriptor. The offload device 112 may determine write permissions to request in block 714. As noted above, in the illustrative embodiment, the translation fetch descriptor may include both a "request write permission" flag as well as a "potential write permission" flag. The two write permission flags may control what flags are set in the ATS requests. In the illustrative embodiment, setting the "request write permission" will cause the "no write" flag to be cleared in the ATS request, indicating that write permission should be requested. If the "request write permission" flag is set, then the "potential write permission" flag should always be cleared. If the "request write permission" flag is cleared and the "potential write permission" flag is cleared, then only read access is expected, and the ATS request should so indicate. If the "request write permission" flag is cleared and the "potential write permission" flag is set, then the ATS request will have the "no write" flag in the ATS request should be set and an additional "potential write" flag should be set. The response of the ATS request can depend on the "request write permission" flag and the "potential write permission" flag, as described in more detail below.

In block 716, the offload device 112 determines an action to take on a page fault. If the block on fault flag is set and if the offload device 112 is capable of sending a PRS request, then the offload device 112 determines that a PRS request should be sent on detection of a page fault. If the block on fault flag is cleared or if the offload device 112 is not capable of sending a PRS request, then the offload device 112 may determine that a PRS request should not be sent on detection of a page fault.

In block 718, the offload device 112 determines what stride may be used. If the use stride flag is cleared, then the offload device 112 may use a default stride value. If the use stride flag is set, then the offload device 112 may use the stride value included in the descriptor. In some embodiments, the offload device 112 may determine that a stride value different from that in the descriptor is more appropriate, even if the use stride flag is set.

In block 720, the offload device 112 determines whether privileged access should be requested based on the value of the privileged flag in the descriptor. In block 722, the offload device 112 determines whether a different PASID should be used.

Figure 8:
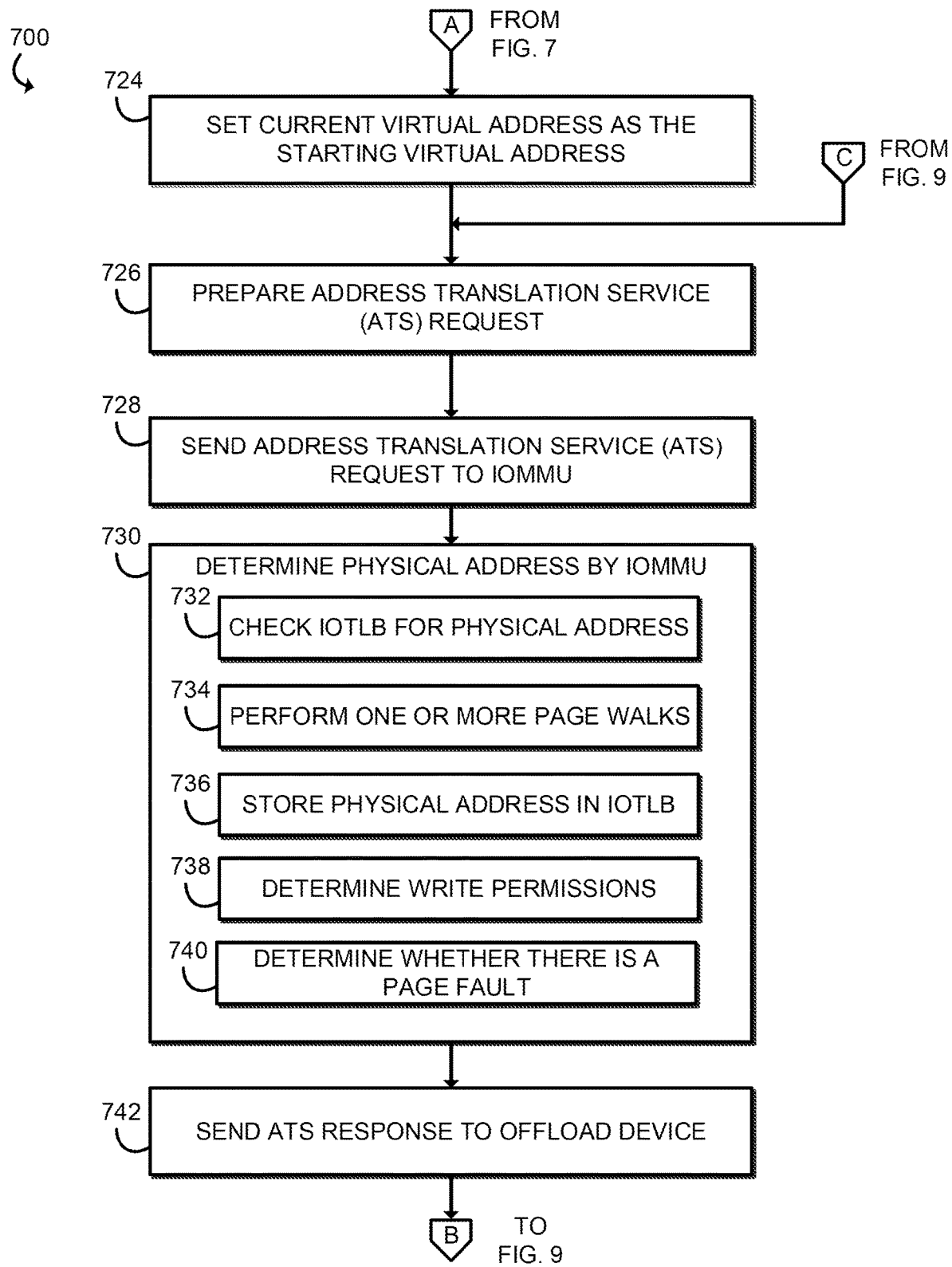

Referring now to FIG. 8, the method 700 proceeds to block 724, in which the offload device 112 sets the current virtual address to translate as the starting virtual address identified in the descriptor.

In block 726, the offload device 112 prepares an ATS request. The ATS request is prepared based on the parameters determined in block 712 based on the flags and other parameters of the translation fetch descriptor. In block 728, the offload device 112 sends the ATS request to the IOMMU 118.

In block 730, the IOMMU 118 determines a physical address corresponding to the virtual address. In block 732, the IOMMU 118 check the IOTLB 122 for the physical address. If the physical address is not in the IOTLB 122, the IOMMU 118 may perform one or more page walks in block 734. It should be appreciated that, in some embodiments, multiple page walks may be required in order to determine the physical address. It should further be appreciated that, by performing multiple page walks for one memory address, a nearby memory address may require no or fewer page walks in order to be translated.

If it is not already cached, the IOMMU 118 stores the physical address in the IOTLB 122 in block 736. It should be appreciated that, in some embodiments, storing the physical address in the IOTLB 122 may be one goal of performing the address translation fetching. For example, in some embodiments, the ATC 128 on the offload device 112 may be too small to store some or all of the physical memory addresses, but fetching the physical addresses to be cached in the IOTLB 122 may still reduce latency in the offload device 112 translating the virtual addresses as it can avoid page walks at the IOMMU 118. Additionally, requesting translation of a sparse distribution of virtual memory addresses may significantly improve the latency of later virtual memory translation requests as fewer page walks at the IOMMU 118 may be required.

In block 738, the IOMMU 118 determines write permission to be sent in the ATS response. The illustrative ATS response can include a bit indicating whether write access was secured and can also include a bit indicating whether write permission is available. If the "no write" flag is set, then the request is a read only request, and the ATS response clears both write permission flags.

If the "no write" flag is cleared, then write permission is requested. If write permission is available, the page is marked as dirty and the write permission flag and available write flag are both set in the ATS response. If write permission is not available, then there is no update to the dirty status of the page, and the write and available write flags are cleared in the ATS response.

If the "no write" flag is set and the "potential write" flag is also set, then the IOMMU 118 checks whether write permission is available and whether the page is currently marked as dirty. If write permission is available and the page is marked as dirty, then write permission is secured, and both the write flag and potential write flag are set in the ATS response. If write permission is available but the page is not marked as dirty, then write permission is not secured, and the write flag is cleared while the potential write flag is set in the ATS response. If write permission is not available, then both the write flag and the potential write flags are cleared in the ATS response. In all cases, the dirty status of the page is not updated when the "no write" flag and the "potential write" flag are both set in the ATS request.

In block 740, the IOMMU 118 determines whether there is a page fault, in which case the physical address cannot be retrieved. In block 742, the IOMMU 118 sends an ATS response to the offload device 112.

Figure 9:
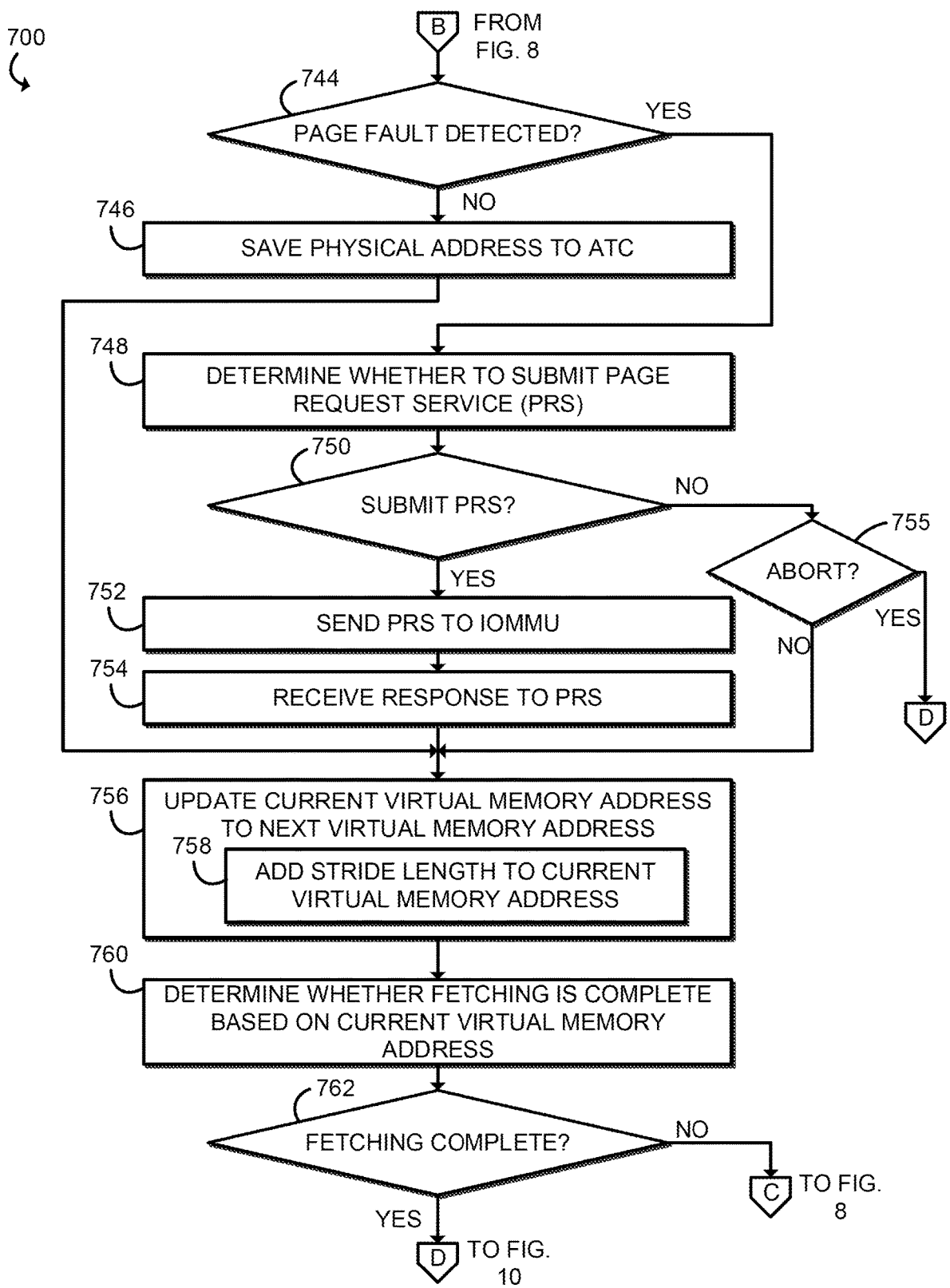

Referring now to FIG. 9, the method 700 proceeds to block 744, in which the offload device 112 checks whether a page fault was detected. If a page fault was not detected, the offload device 112 saves the physical address to the ATC 128, and then the method 700 proceeds to block 756 to proceed to the next virtual address.

If a page fault is detected, the method 700 proceeds from block 744 to block 748 to determine whether to submit a PRS. If the offload device 112 determines that a PRS should be sent, the method proceeds from block 750 to block 752, in which the offload device 112 sends a PRS to the IOMMU 118. The offload device 112 may receive a response to the PRS in block 754 and, if the PRS was successful, may store the physical address in the ATC 128 after resubmitting the ATS request to the IOMMU 118. The method 700 then proceeds to block 756 to proceed to the next virtual address.

Referring back to block 750, if the offload device 112 determines that a PRS request should not be sent, the method 700 proceeds to block 755 to determine whether to abort the fetching operation. If the offload device 112 is to abort, the method 700 proceeds to block 764, in which the offload device 112 prepares a translation fetch completion record. In such an embodiment, the translation fetch completion record may indicate that the page fault occurred along with details of the page fault, such as the location. If the offload device 112 is not to abort, the method 700 proceeds to block 756.

In block 756, the offload device 112 updates the current virtual address being translated to the next virtual memory address. In the illustrative embodiment, the stride length is added to the current virtual memory address to determine the next virtual memory address.

In block 760, the offload device 112 determines whether fetching is complete based on the current virtual memory address. For example, the offload device 112 may check whether the current virtual memory address is higher than the starting virtual memory address plus the region size indicated in the translation fetch descriptor.

In block 762, if fetching is not complete, the method 700 loops back to block 726 in FIG. 8 to prepare an ATS request for the current virtual memory address. If fetching is complete, the method 700 proceeds to block 764 in FIG. 10.

Figure 10:
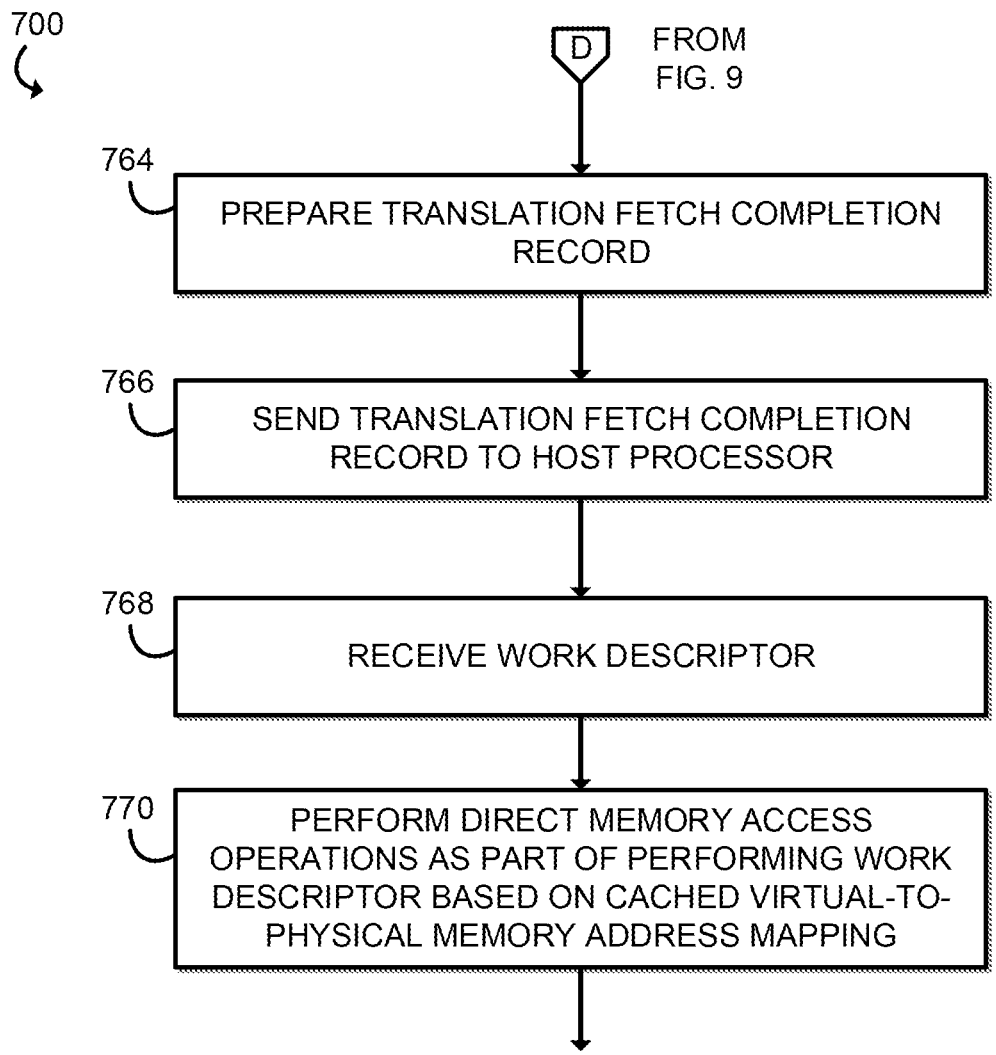

Referring now to FIG. 10, in block 764, the offload device 112 prepares a translation fetch completion record. The translation fetch completion record may indicate, e.g., the bytes completed, whether the operation was completed successfully, and any status information, such as the presence of uncleared page faults or requested write permissions that were not granted. The translation fetch completion record may include a fault address that indicates at which address an unrecoverable page fault occurred.

In block 766, the offload device 112 sends the translation fetch completion record to the host processor 102. The offload device 112 may then receive a work descriptor in block 768. The work descriptor may be received shortly after the translation fetch completion record is sent or there may be a gap in time between completing the translation fetch and receiving the work descriptor.

In block 770, the offload device 112 executes the work descriptor, which includes performing direct memory access (DMA) operations. The DMA operations may be performed using the physical addresses cached in the ATC 128, avoiding the latency required by requesting that the IOMMU 118 perform the translations. For addresses that are not cached in the ATC 128, the latency may still be reduced by either fetching the physical address in the IOMMU 118 or by performing at least some of the page walks necessary to translate the physical address in the IOMMU 118.

EXAMPLES

Illustrative examples of the technologies disclosed herein are provided below. An embodiment of the technologies may include any one or more, and any combination of, the examples described below.

Example 1 includes an offload device comprising a processing engine implemented at least partially in hardware, wherein the processing engine is to receive a translation fetch descriptor from a processor of a compute device to be processed by the processing engine, the translation fetch descriptor comprising an indication of a plurality of virtual memory addresses; send, in response to receipt of the translation fetch descriptor, a request for a physical memory address corresponding to each of the plurality of virtual memory addresses; and send, without reading from or writing to any of the physical addresses corresponding to the plurality of virtual memory addresses, an indication to the processor that the translation fetch descriptor has been processed.

Example 2 includes the subject matter of Example 1, and further including an address translation cache (ATC), wherein the processing engine is further to receive, for each of the plurality of virtual memory addresses, a physical memory address; and cache, for each of the plurality of virtual memory address, the corresponding physical memory address in the ATC.

Example 3 includes the subject matter of any of Examples 1 and 2, and wherein the processing engine is to receive a work descriptor from the processor; perform the task identified in the work descriptor by performing direct memory access (DMA) operations to each physical address corresponding to each virtual memory address of the plurality of memory addresses by accessing physical addresses stored in the ATC and without requesting address translation by the IOMMU during performance of the task.

Example 4 includes the subject matter of any of Examples 1-3, and wherein the offload device is connected to the processor by a PCIe interconnect or a CXL interconnect.

Example 5 includes the subject matter of any of Examples 1-4, and wherein the processing engine is further to receive, in response to the request for a physical memory address for one of the plurality of virtual memory addresses, a response indicating a page fault; and send, in response to receipt of the response indicating the page fault, a page request service (PRS) request corresponding to the page fault.

Example 6 includes the subject matter of any of Examples 1-5, and wherein to send the request for the physical memory address corresponding to each of the plurality of virtual memory addresses comprises to send a request for the physical memory address corresponding to each of the plurality of virtual memory addresses with a no write flag set and with a potential write flag set.

Example 7 includes the subject matter of any of Examples 1-6, and wherein the processing engine is further to record a write flag as set and an available write flag as set for a first physical address corresponding to a first virtual memory address of the plurality of memory addresses based on a response to the corresponding request for the physical memory address; and record a write flag as cleared and an available write flag as set for a second physical address corresponding to a second virtual memory address of the plurality of memory addresses based on a response to the corresponding request for the physical memory address.

Example 8 includes the subject matter of any of Examples 1-7, and wherein the indication of the plurality of virtual memory addresses comprises a starting virtual memory address, a region size, and a region stride, wherein the difference between the value of each of the plurality of virtual memory addresses and the adjacent virtual memory address of the plurality of virtual memory addresses is the region stride.

Example 9 includes a compute device comprising a processor; a memory; an input/output memory management unit (IOMMU); an offload device; and one or more storage devices comprising a plurality of instructions stored thereon that, when executed by the processor, causes the processor to determine a plurality of virtual memory addresses to be used by the offload device to execute a task; and send a translation fetch descriptor comprising an indication of the plurality of virtual memory addresses to the offload device, wherein the offload device, in response to receipt of the translation fetch descriptor, is to send a request to the IOMMU for a physical address corresponding to each of the plurality of virtual memory addresses; and send, without reading from or writing to any of the physical addresses corresponding to the plurality of virtual memory addresses, an indication to the processor that the translation fetch descriptor has been processed; wherein the plurality of instructions further cause the processor to send a work descriptor to the offload device to execute the task, wherein the task to be executed by the offload device requires a read from or a write to each of the plurality of virtual memory addresses.

Example 10 includes the subject matter of Example 9, and wherein the offload device comprises an address translation cache (ATC), wherein the offload device is further to receive, for each of the plurality of virtual memory addresses, a physical memory address; and cache, for each of the plurality of virtual memory address, the corresponding physical memory address in the ATC.

Example 11 includes the subject matter of any of Examples 9 and 10, and wherein the offload device is connected to the processor by a PCIe interconnect or CXL interconnect.

Example 12 includes the subject matter of any of Examples 9-11, and wherein the offload device is further to receive, in response to the request for a physical memory address for one of the plurality of virtual memory addresses, a response indicating a page fault; and send, in response to receipt of the response indicating the page fault, a page request service (PRS) request corresponding to the page fault.

Example 13 includes the subject matter of any of Examples 9-12, and wherein to send the request for the physical memory address corresponding to each of the plurality of virtual memory addresses comprises to send a request for the physical memory address corresponding to each of the plurality of virtual memory addresses with a no write flag set and with a potential write flag set.

Example 14 includes the subject matter of any of Examples 9-13, and wherein the IOMMU is to, for each request for the physical memory address corresponding to each of the plurality of virtual memory addresses with a no write flag set and with a potential write flag set if write permission is denied, send a response to the offload device with a write flag cleared and an available write flag cleared; if write permission is allowed and the dirty bit of the page corresponding to the corresponding physical address is cleared, send a response to the offload device with a write flag cleared and an available write flag set; and if write permission is allowed and the dirty bit of the page corresponding to the corresponding physical address is set, send a response to the offload device with a write flag set and an available write flag set.

Example 15 includes the subject matter of any of Examples 9-14, and wherein the offload device is further to record a write flag as set and an available write flag as set for a first physical address corresponding to a first virtual memory address of the plurality of memory addresses based on a response to the corresponding request for the physical memory address; and record a write flag as cleared and an available write flag as set for a second physical address corresponding to a second virtual memory address of the plurality of memory addresses based on a response to the corresponding request for the physical memory address.

Example 16 includes the subject matter of any of Examples 9-15, and wherein the IOMMU is to receive the request for the physical address corresponding to each of the plurality of virtual memory addresses; determine whether each physical address corresponding to each of the plurality of virtual memory addresses is present in an input/output translation lookaside buffer (IOTLB) of the IOMMU; perform, for each physical address corresponding to each of the plurality of virtual memory addresses that is not present in the IOTLB, one or more page walks to access the corresponding physical address; and determine, for each physical address corresponding to each of the plurality of virtual memory addresses, whether a page fault occurred in looking up the corresponding physical address.

Example 17 includes the subject matter of any of Examples 9-16, and wherein the IOMMU is to perform a plurality of page walks in order to access at least some of the physical addresses corresponding to the plurality of virtual addresses.

Example 18 includes the subject matter of any of Examples 9-17, and wherein the IOMMU is to send an indication to the offload device for each page fault that is detected.

Example 19 includes the subject matter of any of Examples 9-18, and wherein the offload device is configured to send a page request service (PRS) request for each page fault that is detected by the IOMMU.

Example 20 includes the subject matter of any of Examples 9-19, and wherein the indication of the plurality of virtual memory addresses comprises a starting virtual memory address, a region size, and a region stride, wherein the difference between the value of each of the plurality of virtual memory addresses and the adjacent virtual memory address of the plurality of virtual memory addresses is the region stride.

Example 21 includes the subject matter of any of Examples 9-20, and wherein the offload device is to receive the work descriptor from the processor; perform the task identified in the work descriptor by performing direct memory access (DMA) operations to each physical address corresponding to each virtual memory address of the plurality of memory addresses without requesting address translation by the IOMMU during performance of the task.

Example 22 includes one or more computer-readable media comprising a plurality of instructions stored thereon that, when executed by a processor of a compute device, causes the processor to determine a plurality of virtual memory addresses to be used by an offload device of the compute device to execute a task; send a translation fetch descriptor comprising an indication of the plurality of virtual memory addresses to the offload device to instruct the offload device to fetch physical addresses corresponding to the plurality of virtual addresses; perform one or more operations after sending of the translation fetch descriptor; and send, after performance of the one or more operations, a work descriptor to the offload device to execute the task after performance of the one or more operations, wherein the task to be executed by the offload device requires a read from or a write to each of the plurality of virtual memory addresses.

Example 23 includes the subject matter of Example 22, and wherein to determine the plurality of virtual memory addresses to be used by the offload device comprises to determine the plurality of virtual memory addresses based on a current plurality of virtual memory addresses associated with a current task of the processor, wherein the current plurality of virtual memory addresses is different from the plurality of virtual memory address to be used by the offload device.

Example 24 includes the subject matter of any of Examples 22 and 23, and wherein to perform one or more operations after sending of the translation fetch descriptor comprises to perform one or more write operations to one or more addresses within the plurality of virtual memory addresses prior to sending the work descriptor to the offload device.

Example 25 includes the subject matter of any of Examples 22-24, and wherein the indication of the plurality of virtual memory addresses comprises a starting virtual memory address, a region size, and a region stride.

Example 26 includes an offload device comprising means for receiving a translation fetch descriptor from a processor of a compute device to be processed by a processing engine, the translation fetch descriptor comprising an indication of a plurality of virtual memory addresses; means for sending, in response to receipt of the translation fetch descriptor, a request for a physical memory address corresponding to each of the plurality of virtual memory addresses; and means for send, without reading from or writing to any of the physical addresses corresponding to the plurality of virtual memory addresses, an indication to the processor that the translation fetch descriptor has been processed.

Example 27 includes the subject matter of Example 26, and further including an address translation cache (ATC), further comprising means for receiving, for each of the plurality of virtual memory addresses, a physical memory address; and means for caching, for each of the plurality of virtual memory address, the corresponding physical memory address in the ATC.

Example 28 includes the subject matter of any of Examples 26 and 27, and further including means for receiving a work descriptor from the processor; means for performing the task identified in the work descriptor by performing direct memory access (DMA) operations to each physical address corresponding to each virtual memory address of the plurality of memory addresses by accessing physical addresses stored in the ATC and without requesting address translation by the IOMMU during performance of the task.

Example 29 includes the subject matter of any of Examples 26-28, and wherein the offload device is connected to the processor by a PCIe interconnect or a CXL interconnect.

Example 30 includes the subject matter of any of Examples 26-29, and further including means for receiving, in response to the request for a physical memory address for one of the plurality of virtual memory addresses, a response indicating a page fault; and means for sending, in response to receipt of the response indicating the page fault, a page request service (PRS) request corresponding to the page fault.

Example 31 includes the subject matter of any of Examples 26-30, and wherein the means for sending the request for the physical memory address corresponding to each of the plurality of virtual memory addresses comprises means for sending a request for the physical memory address corresponding to each of the plurality of virtual memory addresses with a no write flag set and with a potential write flag set.

Example 32 includes the subject matter of any of Examples 26-31, and further including means for recording a write flag as set and an available write flag as set for a first physical address corresponding to a first virtual memory address of the plurality of memory addresses based on a response to the corresponding request for the physical memory address; and means for recording a write flag as cleared and an available write flag as set for a second physical address corresponding to a second virtual memory address of the plurality of memory addresses based on a response to the corresponding request for the physical memory address.

Example 33 includes the subject matter of any of Examples 26-32, and wherein the indication of the plurality of virtual memory addresses comprises a starting virtual memory address, a region size, and a region stride, wherein the difference between the value of each of the plurality of virtual memory addresses and the adjacent virtual memory address of the plurality of virtual memory addresses is the region stride.

Example 34 includes a compute device comprising means for determining a plurality of virtual memory addresses to be used by an offload device to execute a task; means for sending a translation fetch descriptor comprising an indication of the plurality of virtual memory addresses to the offload device, means for sending, in response to receipt of the translation fetch descriptor, a request to an input/output memory management unit (IOMMU) for a physical address corresponding to each of the plurality of virtual memory addresses; means for sending, in response to receipt of the translation fetch descriptor and without reading from or writing to any of the physical addresses corresponding to the plurality of virtual memory addresses, an indication to the processor that the translation fetch descriptor has been processed; means for sending a work descriptor to the offload device to execute the task, wherein the task to be executed by the offload device requires a read from or a write to each of the plurality of virtual memory addresses.

Example 35 includes the subject matter of Example 34, and wherein the offload device comprises an address translation cache (ATC), further comprising means for receiving, for each of the plurality of virtual memory addresses, a physical memory address; and means for caching, for each of the plurality of virtual memory address, the corresponding physical memory address in the ATC.

Example 36 includes the subject matter of any of Examples 34 and 35, and wherein the offload device is connected to the processor by a PCIe interconnect or CXL interconnect.

Example 37 includes the subject matter of any of Examples 34-36, and further including means for receiving, in response to the request for a physical memory address for one of the plurality of virtual memory addresses, a response indicating a page fault; and means for sending, in response to receipt of the response indicating the page fault, a page request service (PRS) request corresponding to the page fault.

Example 38 includes the subject matter of any of Examples 34-37, and wherein the means for sending the request for the physical memory address corresponding to each of the plurality of virtual memory addresses comprises means for sending a request for the physical memory address corresponding to each of the plurality of virtual memory addresses with a no write flag set and with a potential write flag set.

Example 39 includes the subject matter of any of Examples 34-38, and wherein the IOMMU is to, for each request for the physical memory address corresponding to each of the plurality of virtual memory addresses with a no write flag set and with a potential write flag set if write permission is denied, send a response to the offload device with a write flag cleared and an available write flag cleared; if write permission is allowed and the dirty bit of the page corresponding to the corresponding physical address is cleared, send a response to the offload device with a write flag cleared and an available write flag set; and if write permission is allowed and the dirty bit of the page corresponding to the corresponding physical address is set, send a response to the offload device with a write flag set and an available write flag set.

Example 40 includes the subject matter of any of Examples 34-39, and further including means for recording a write flag as set and an available write flag as set for a first physical address corresponding to a first virtual memory address of the plurality of memory addresses based on a response to the corresponding request for the physical memory address; and means for recording a write flag as cleared and an available write flag as set for a second physical address corresponding to a second virtual memory address of the plurality of memory addresses based on a response to the corresponding request for the physical memory address.

Example 41 includes the subject matter of any of Examples 34-40, and further including means for receiving the request for the physical address corresponding to each of the plurality of virtual memory addresses; means for determining whether each physical address corresponding to each of the plurality of virtual memory addresses is present in an input/output translation lookaside buffer (IOTLB) of the IOMMU; means for performing, for each physical address corresponding to each of the plurality of virtual memory addresses that is not present in the IOTLB, one or more page walks to access the corresponding physical address; and means for determining, for each physical address corresponding to each of the plurality of virtual memory addresses, whether a page fault occurred in looking up the corresponding physical address.

Example 42 includes the subject matter of any of Examples 34-41, and further including means for performing a plurality of page walks in order to access at least some of the physical addresses corresponding to the plurality of virtual addresses.

Example 43 includes the subject matter of any of Examples 34-42, and further including means for sending an indication to the offload device for each page fault that is detected.

Example 44 includes the subject matter of any of Examples 34-43, and further including means for sending a page request service (PRS) request for each page fault that is detected by the IOMMU.

Example 45 includes the subject matter of any of Examples 34-44, and wherein the indication of the plurality of virtual memory addresses comprises a starting virtual memory address, a region size, and a region stride, wherein the difference between the value of each of the plurality of virtual memory addresses and the adjacent virtual memory address of the plurality of virtual memory addresses is the region stride.

Example 46 includes the subject matter of any of Examples 34-45, and further including means for receive the work descriptor from a processor of the compute device; means for performing the task identified in the work descriptor by performing direct memory access (DMA) operations to each physical address corresponding to each virtual memory address of the plurality of memory addresses without requesting address translation by the IOMMU during performance of the task.

The invention claimed is:
1. An offload device comprising:
an address translation cache (ATC); and
a processing engine implemented at least partially in hardware, wherein the processing engine is to:
receive a translation fetch descriptor from a processor of a compute device to be processed by the processing engine, the translation fetch descriptor comprising an indication of a plurality of virtual memory addresses;
send, in response to receipt of the translation fetch descriptor, a request for a physical memory address corresponding to individual virtual memory addresses of the plurality of virtual memory addresses;
receive, for individual virtual memory addresses of the plurality of virtual memory addresses, a physical memory address;
cache, for individual virtual memory addresses of the plurality of virtual memory addresses, the corresponding physical memory address in the ATC;
send, without reading from or writing to any of the physical addresses corresponding to the plurality of virtual memory addresses, an indication to the processor that the translation fetch descriptor has been processed;
receive a work descriptor from the processor after the indication is sent to the processor that the translation fetch descriptor has been processed, wherein the plurality of virtual memory addresses indicated by the translation fetch descriptor correlates to the work descriptor; and
perform a task identified in the work descriptor by performing direct memory access (DMA) operations to individual physical memory addresses corresponding to individual virtual memory addresses of the plurality of virtual memory addresses by accessing physical memory addresses stored in the ATC and without requesting address translation by an IOMMU during performance of the task.

2. The offload device of claim 1, wherein the offload device is connected to the processor by a PCIe interconnect or a CXL interconnect.

3. The offload device of claim 1, wherein the processing engine is further to:
   receive, in response to the request for a physical memory address for one of the plurality of virtual memory addresses and prior to receipt of the work descriptor, a response indicating a page fault;
   send, in response to receipt of the response indicating the page fault and prior to receipt of the work descriptor, a page request service (PRS) request corresponding to the page fault; and
   receive the work descriptor after sending the PRS request corresponding to the page fault for the one of the plurality of virtual memory addresses corresponding to the work descriptor.

4. The offload device of claim 1, wherein to send the request for the physical memory address corresponding to individual virtual memory addresses of the plurality of virtual memory addresses comprises to send a request for the physical memory address corresponding to individual virtual memory addresses of the plurality of virtual memory addresses with a no write flag set and with a potential write flag set.

5. The offload device of claim 4, wherein the processing engine is further to:
   record a write flag as set and an available write flag as set for a first physical address corresponding to a first virtual memory address of the plurality of virtual memory addresses based on a response to the corresponding request for the physical memory address; and
   record a write flag as cleared and an available write flag as set for a second physical address corresponding to a second virtual memory address of the plurality of virtual memory addresses based on a response to the corresponding request for the physical memory address.

6. The offload device of claim 1, wherein the indication of the plurality of virtual memory addresses comprises a starting virtual memory address, a region size, and a region stride, wherein a difference between a value of individual virtual memory addresses of the plurality of virtual memory addresses and an adjacent virtual memory address of the plurality of virtual memory addresses is the region stride.

7. A compute device comprising:
   a processor;
   a memory;
   an input/output memory management unit (IOMMU);
   an offload device; and
   one or more storage devices comprising a plurality of instructions stored thereon that, when executed by the processor, causes the processor to:
      determine a plurality of virtual memory addresses to be used by the offload device to execute a task; and
      send a translation fetch descriptor comprising an indication of the plurality of virtual memory addresses to the offload device,
   wherein the offload device, in response to receipt of the translation fetch descriptor, is to:
      send a request to the IOMMU for a physical address corresponding to individual virtual memory addresses of the plurality of virtual memory addresses;
      receive, for individual virtual memory addresses of the plurality of virtual memory addresses, a physical memory address;
      cache, for individual virtual memory addresses of the plurality of virtual memory addresses, the corresponding physical memory address in an address translation cache (ATC) of the offload device; and
      send, without reading from or writing to any of the physical addresses corresponding to the plurality of virtual memory addresses, an indication to the processor that the translation fetch descriptor has been processed,
   wherein the plurality of instructions further cause the processor to send a work descriptor to the offload device to execute the task, wherein the task to be executed by the offload device requires a read from or a write to individual virtual memory addresses of the plurality of virtual memory addresses,
   wherein the offload device is to:
      receive the work descriptor from the processor after the indication is sent to the processor that the translation fetch descriptor has been processed, wherein the plurality of virtual memory addresses indicated by the translation fetch descriptor correlates to the work descriptor; and
      perform the task identified in the work descriptor by performing direct memory access (DMA) operations to individual physical memory addresses corresponding to individual virtual memory addresses of the plurality of virtual memory addresses by accessing physical addresses stored in the ATC and without requesting address translation by the IOMMU during performance of the task.

8. The compute device of claim 7, wherein the offload device is further to:
   receive, in response to the request for a physical memory address for one of the plurality of virtual memory addresses and prior to receipt of the work descriptor, a response indicating a page fault;
   send, in response to receipt of the response indicating the page fault and prior to receipt of the work descriptor, a page request service (PRS) request corresponding to the page fault; and
   receive the work descriptor after sending the PRS request corresponding to the page fault for the one of the plurality of virtual memory addresses corresponding to the work descriptor.

9. The compute device of claim 7, wherein to send the request for the physical memory address corresponding to individual virtual memory addresses of the plurality of virtual memory addresses comprises to send a request for the physical memory address corresponding to individual virtual memory addresses of the plurality of virtual memory addresses with a no write flag set and with a potential write flag set.

10. The compute device of claim 9, wherein the IOMMU is to, for individual requests for the physical memory address corresponding to individual virtual memory addresses of the plurality of virtual memory addresses with a no write flag set and with a potential write flag set:
   determine whether write permission for the corresponding request for the physical memory address is denied or allowed;
   if write permission is denied, send a response to the offload device with a write flag cleared and an available write flag cleared;

if write permission is allowed and a dirty bit of a page corresponding to the corresponding physical address is cleared, send a response to the offload device with a write flag cleared and an available write flag set; and if write permission is allowed and the dirty bit of the page corresponding to the corresponding physical address is set, send a response to the offload device with a write flag set and an available write flag set.

11. The compute device of claim 9, wherein the offload device is further to:

record a write flag as set and an available write flag as set for a first physical address corresponding to a first virtual memory address of the plurality of virtual memory addresses based on a response to the corresponding request for the physical memory address; and record a write flag as cleared and an available write flag as set for a second physical address corresponding to a second virtual memory address of the plurality of virtual memory addresses based on a response to the corresponding request for the physical memory address.

12. The compute device of claim 7, wherein the IOMMU is to:

receive the request for the physical address corresponding to individual virtual memory addresses of the plurality of virtual memory addresses;

determine whether individual physical addresses corresponding to individual virtual memory addresses of the plurality of virtual memory addresses is present in an input/output translation lookaside buffer (IOTLB) of the IOMMU;

perform, for individual physical addresses corresponding to individual virtual memory addresses of the plurality of virtual memory addresses that is not present in the IOTLB, one or more page walks to access the corresponding physical address; and determine, for individual physical addresses corresponding to individual virtual memory addresses of the plurality of virtual memory addresses, whether a page fault occurred in looking up the corresponding physical address.

13. The compute device of claim 12, wherein the IOMMU is to perform a plurality of page walks in order to access at least some of the physical addresses corresponding to the plurality of virtual addresses.

14. The compute device of claim 12, wherein the IOMMU is to send an indication to the offload device for individual page faults that are detected.

15. The compute device of claim 14, wherein the offload device is configured to send a page request service (PRS) request for individual page faults that are detected by the IOMMU.

16. The compute device of claim 7, wherein the indication of the plurality of virtual memory addresses comprises a starting virtual memory address, a region size, and a region stride, wherein a difference between a value of individual virtual memory addresses of the plurality of virtual memory addresses and an adjacent virtual memory address of the plurality of virtual memory addresses is the region stride.

17. The compute device of claim 7, wherein the offload device is to:

receive the work descriptor from the processor after the indication is sent to the processor that the translation fetch descriptor has been processed; and perform the task identified in the work descriptor by performing direct memory access (DMA) operations to individual physical addresses corresponding to individual virtual memory addresses of the plurality of virtual memory addresses without requesting address translation by the IOMMU during performance of the task.

18. One or more non-transitory computer-readable media comprising a plurality of instructions stored thereon that, when executed by a processor of a compute device, causes the processor to:

determine a plurality of virtual memory addresses to be used by an offload device of the compute device to execute a task;

send a translation fetch descriptor comprising an indication of the plurality of virtual memory addresses to the offload device to instruct the offload device to fetch physical addresses corresponding to the plurality of virtual addresses, wherein the offload device is to, in response to the translation fetch descriptor, cache, for individual virtual memory addresses of the plurality of virtual memory addresses, the corresponding physical memory address in an address translation cache (ATC) of the offload device;

perform one or more operations after sending of the translation fetch descriptor;

receive, from the offload device, an indication that the translation fetch descriptor has been processed; and send, after performance of the one or more operations, a work descriptor to the offload device to execute the task after performance of the one or more operations, wherein the task to be executed by the offload device requires a read from or a write to individual virtual memory addresses of the plurality of virtual memory addresses, wherein the offload device is to, in response to receipt of the work descriptor, perform the task identified in the work descriptor by performing direct memory access (DMA) operations to individual physical addresses corresponding to individual virtual memory addresses of the plurality of virtual memory addresses by accessing physical memory addresses stored in the ATC and without requesting address translation by an IOMMU during performance of the task.

19. The one or more non-transitory computer-readable media of claim 18, wherein to determine the plurality of virtual memory addresses to be used by the offload device comprises to determine the plurality of virtual memory addresses based on a current plurality of virtual memory addresses associated with a current task of the processor, wherein the current plurality of virtual memory addresses is different from the plurality of virtual memory address to be used by the offload device.

20. The one or more non-transitory computer-readable media of claim 18, wherein to perform one or more operations after sending of the translation fetch descriptor comprises to perform one or more write operations to one or more addresses within the plurality of virtual memory addresses prior to sending the work descriptor to the offload device.

21. The one or more non-transitory computer-readable media of claim 18, wherein the indication of the plurality of virtual memory addresses comprises a starting virtual memory address, a region size, and a region stride.

22. A system comprising the offload device of claim 1, further comprising the compute device, wherein the compute device comprises the offload device, wherein a processor of the compute device is to send the translation fetch descriptor before the work descriptor in order to cache the physical memory address in the ATC in the offload device for the task of the work descriptor.

\* \* \* \* \*